Oct. 4, 1932.    F. A. THAHELD    1,880,531
AIR INTAKE AND EXHAUST MECHANISM OF DIESEL TYPE OF ENGINES
Filed Oct. 4, 1930    4 Sheets-Sheet 1

Inventor
Feri A. Thaheld

By Jack A. Ashley
Attorney

Oct. 4, 1932.   F. A. THAHELD   1,880,531
AIR INTAKE AND EXHAUST MECHANISM OF DIESEL TYPE OF ENGINES
Filed Oct. 4, 1930   4 Sheets-Sheet 2

Inventor
Feri A. Thaheld

By
Jack A. Ashley
Attorney

Oct. 4, 1932. F. A. THAHELD 1,880,531
AIR INTAKE AND EXHAUST MECHANISM OF DIESEL TYPE OF ENGINES
Filed Oct. 4, 1930 4 Sheets-Sheet 3

Inventor
Feri A. Thaheld
By Jack A. Schley
Attorney

Oct. 4, 1932.  F. A. THAHELD  1,880,531
AIR INTAKE AND EXHAUST MECHANISM OF DIESEL TYPE OF ENGINES
Filed Oct. 4, 1930  4 Sheets-Sheet 4

Inventor
Feri A. Thaheld

By Jack A. Ashley
Attorney

Patented Oct. 4, 1932

1,880,531

UNITED STATES PATENT OFFICE

FERI A. THAHELD, OF DALLAS, TEXAS, ASSIGNOR, BY MESNE ASSIGNMENTS, TO GUIBERSON DIESEL ENGINE COMPANY, OF DOVER, DELAWARE, A CORPORATION OF DELAWARE

AIR INTAKE AND EXHAUST MECHANISM OF DIESEL TYPE OF ENGINES

Application filed October 4, 1930. Serial No. 486,345.

This invention relates to new and useful improvements in the air intake and exhaust mechanism of Diesel type of engines.

The invention has particularly to do with the admission of air and the discharge of the exhaust gases of the engine.

One object of the invention is to prevent a counterflow of the exhaust gases, whereby their escape through the air intake is prevented and their discharge through the exhaust conductor is assured.

A further object of the invention is to provide means for inducing a positive flow of the exhaust gases in a direction rearwardly with respect to the line of movement of the engine where the latter is used on an airplane or other vehicle.

Still another object of the invention is to provide means for creating a rearward draft, whereby the exhaust gases are carried rearwardly when discharged from the cylinder.

A further object of the invention is to provide a continuous conductor having connection intermediate its ends with a single port entering the engine cylinder and provided with an air intake opening at its forward end and an exhaust opening at its rearward end, said openings being located on opposite sides of the cylinder port, which is offset in the conductor so that air currents may by-pass the same.

An important object of the invention is to provide an upstanding guard in the manifold at the cylinder port acting to deflect the inflowing air currents and to cause them to enter the port from the rear side; also acting to cause the exhaust gases to be directed rearwardly from said port.

A construction designed to carry out the invention will be hereinafter described together with other features of the invention.

Figure 1:
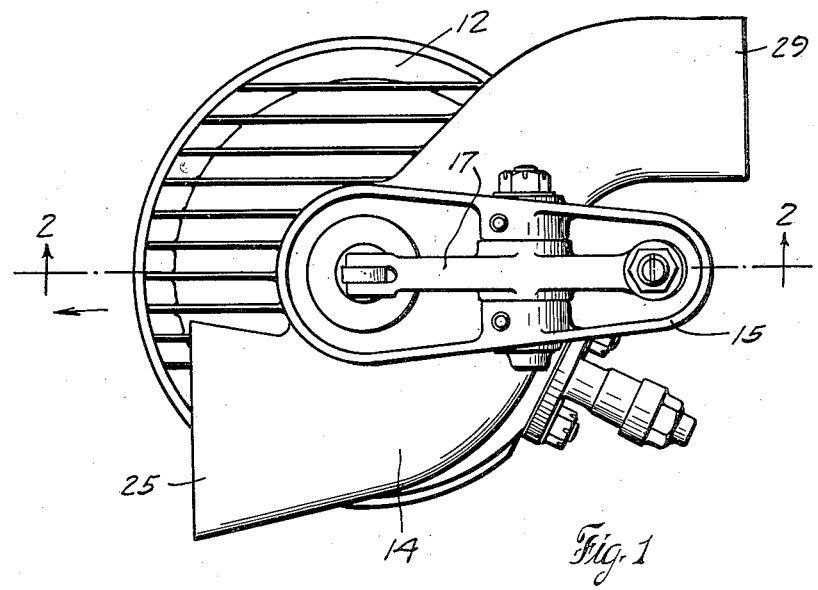
Figure 2:
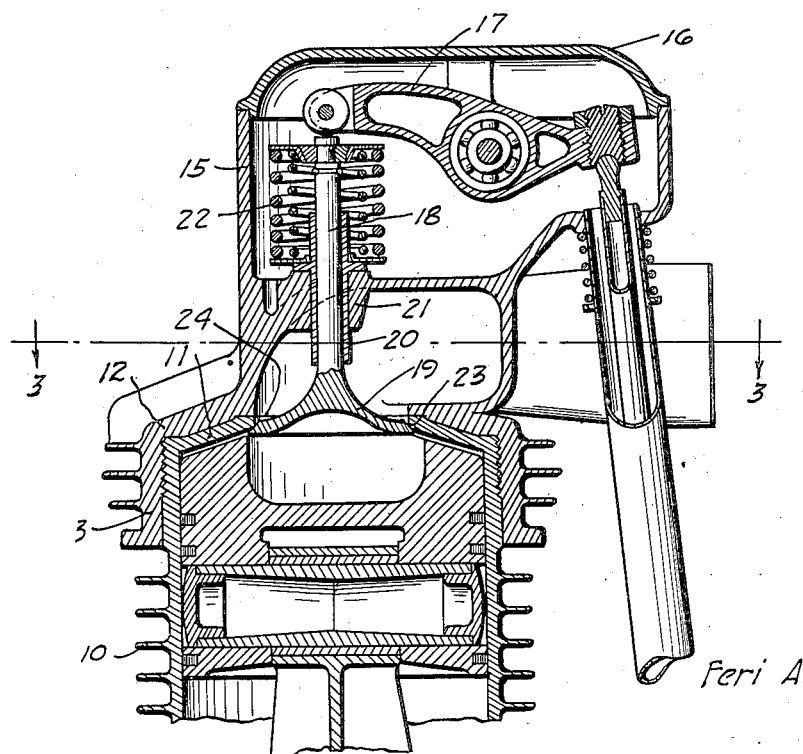
Figure 3:
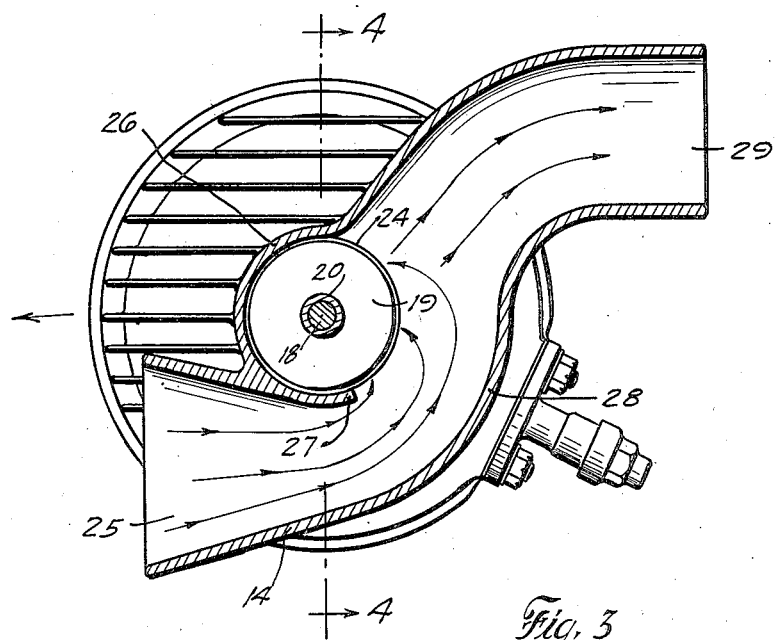
Figure 4:
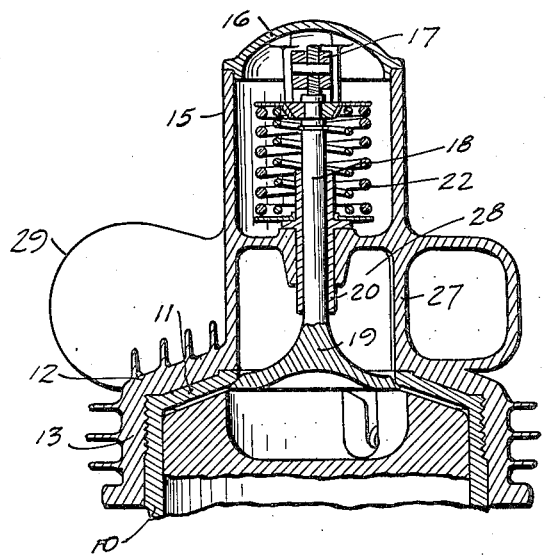
Figure 5:
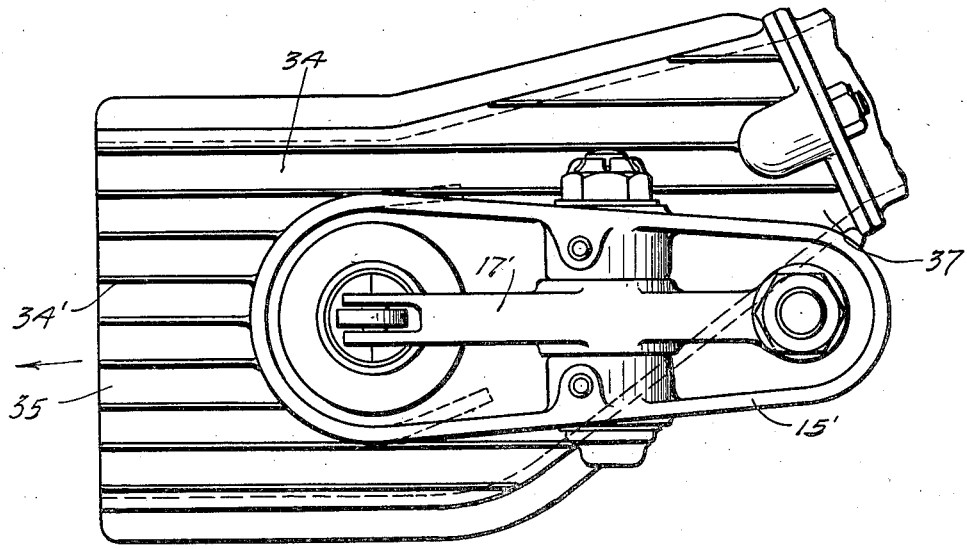
Figure 6:
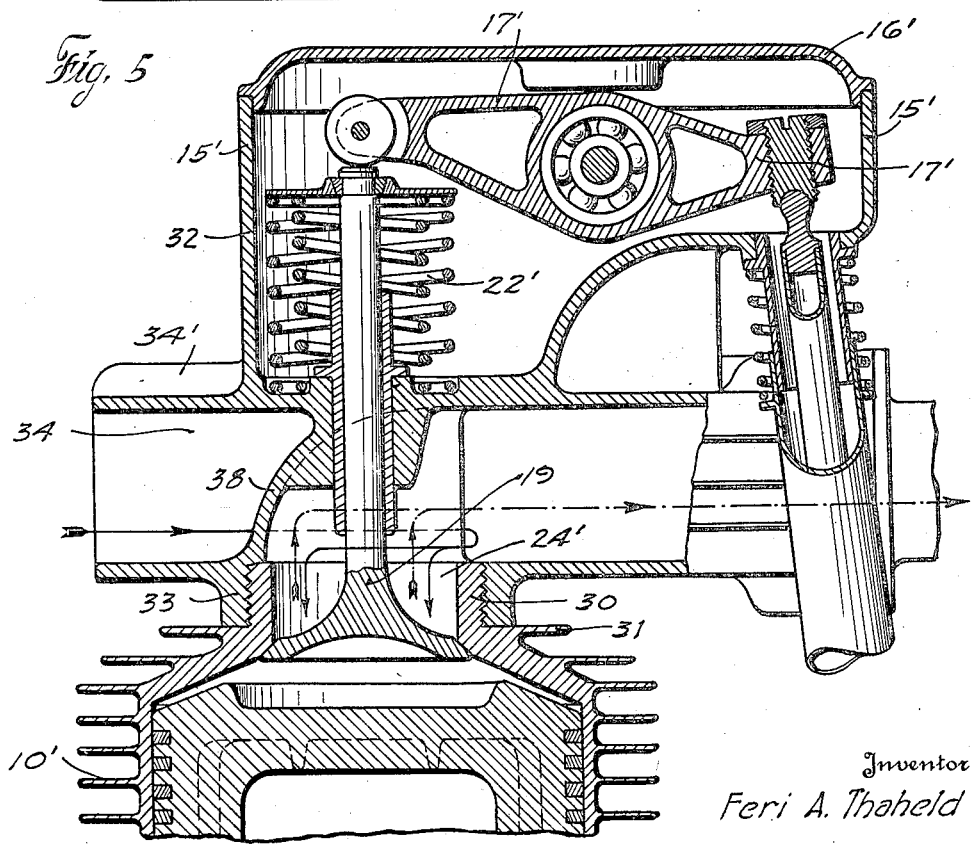
Figure 7:
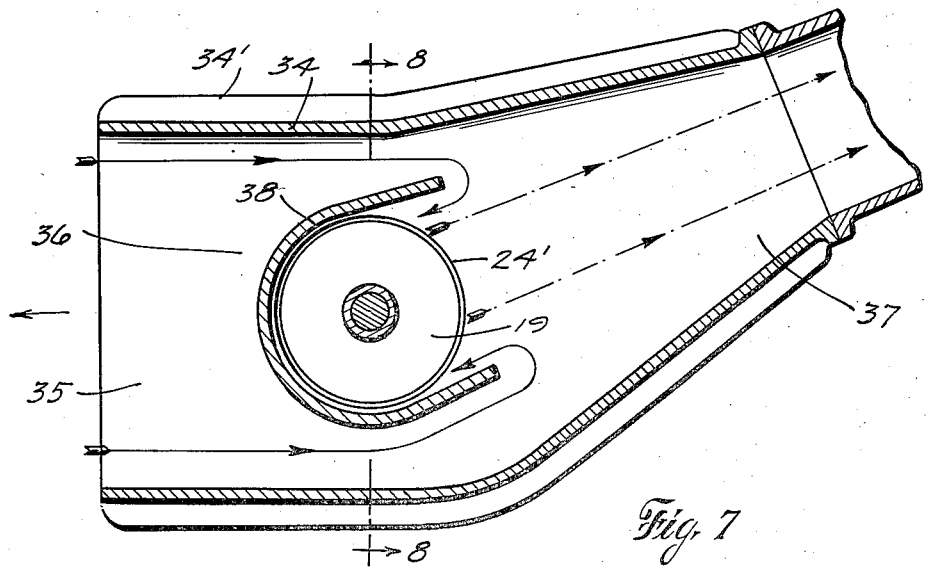
Figure 8:
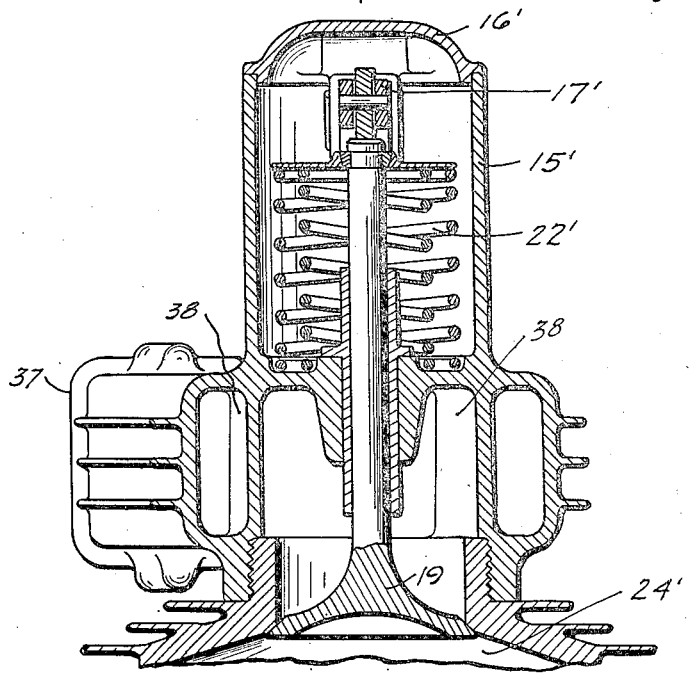

The invention will be more readily understood from a reading of the following specification and by reference to the accompanying drawings in which an example of the invention is shown, and wherein:

Figure 1 is a plan view of an engine cylinder equipped with a manifold constructed in accordance with the invention, Figure 2 is a vertical sectional view of the same, Figure 3 is a horizontal cross-sectional view through the manifold, Figure 4 is a horizontal sectional view taken on the line 4—4 of Figure 3, Figure 5 is a plan view of another form of manifold with the rocker box cover removed, Figure 6 is a vertical sectional view of the same, Figure 7 is a horizontal cross-sectional view of the manifold shown in Figure 5 and Figure 6, and Figure 8 is a transverse vertical sectional view taken on the line 8—8 of Figure 7.

This application is filed as a continuation in part of my co-pending application filed April 7, 1930, Serial No. 442,316.

In the drawings the numeral 10 designates an engine cylinder of a Diesel type of engine, which cylinder is provided with an inclined head 11. A cap 12 is mounted on the head 11 and has a depending annular apron 13 which is screwed or otherwise fastened on the upper end of the cylinder. The cap is provided wtih a sinuous manifold 14 and a rocker box 15 is mounted on top of the manifold enclosed by a removable cover 16. The cap, manifold and box are preferably made integral, but this is not essential.

A rocker arm 17 is journaled in the box and engages the stem 18 of a valve 19, which stem is slidable in a guide 20. The guide is secured in a boss 21 in the roof of the manifold. The valve is held closed by a spring 22. These details are not a particular part of the invention, as any type of valve and valve operator may be used.

The valve 19 engages an annular seat 23 on the underside of the port 24 in the cylinder head 11 and when said valve is elevated it is closed. This type of engine employs a single valve and a single port which serves to admit the charge of air and upon the next operation to permit the escape of the exhaust gases.

In Figures 1 and 3 the arrow at the left indicates the line of travel through which the cylinder is moved and the left side thus becomes the forward side and the right side the rear side. This permits the application of the terms "front" and "rear" to the ends of the manifold 14. The front end 25 of the manifold is flared forwardly so as to provide an ample opening for the admission of air. An offset pocket or recess 26 is provided in the manifold contiguous to the port 24. An upright deflecting wall or web 27 provided in the manifold and contiguous to the port 24 causes the air currents admitted to the manifold to enter the rear side of the port 24 and also prevents the exhaust gases from moving forwardly into the mouth of the manifold.

The central portion of the manifold at which the port 24 is located is enlarged and the outer wall 28 opposite the pocket 26 is gradually curved so as to tend to deflect the inrushing air currents into the pocket, but at the same time permitting a certain portion of the air currents to by-pass the pocket and enter the tubular exhaust end 29 of the manifold. It is pointed out that the entrance to the manifold is substantially on one side of the port 24 and pocket 26 while the exhaust outlet is on the opposite side. This is particularly true of the axis of movement of the cylinder which passes through the center of the valve.

By locating the air entrance on one side and the exhaust outlet on the opposite side of the cylinder port, it is obvious that the tendency of the air currents is to rush through the manifold and by-pass the port so as to pull out the exhaust gases and carry them rearwardly, unless counteracted by the suction of the piston on the intake stroke. This is a very important feature of the invention because it precludes the escape of the exhaust gases forwardly through the air inlet, which has been the objection to some types of motors for use in airplanes. By reason of the sinuous shape and the gradual curve of the walls of the manifold toward the offset pocket 26, the air currents are caused to whirl when entering the pocket and flowing into the cylinder, and this tends to create a turbulence in the cylinder which is highly advantageous in producing a more effective combustion. When the exhaust gases escape through the air inlet of the manifold the propeller will blow such gases rearwardly with serious results to the aviator. The flaring nature of the inlet 25 produces a somewhat ventura effect and this also acts to defeat a counterflow of the exhaust gases.

In Figures 5 to 8 inclusive, I have shown another form of manifold which is also set forth in my co-pending application filed April 7, 1930, Serial No. 442,316, but which is not specifically claimed in said application except in combination with other parts.

The outer end of an engine cylinder 10' is given a frusto-conical shape and is also formed with an externally threaded collar 30 surrounded by a head flange 31. A cylinder head 32 mounted on the cylinder has a depending internally screw-threaded collar 33 engaging on the collar 30 and fastened on the flange 31. The head is provided with a transverse horizontal manifold 34 which has external radiating fins 34' extending longitudinally thereof and in the general direction of the longitudinal axis of the crank-shaft of the engine, so as to form air channels when the engine is moved forwardly. A rocker box 15' is mounted on top of the manifold and enclosed by a removable cover 16'. The head, manifold and box are preferably made integral, but this is not essential.

As in the preferred form a single valve 19 is employed for each cylinder, whereby the collar 30 constitutes both an intake and an exhaust port 24'. The valve is operated under tension of springs 22' by a rocker arm 17' which is journaled in the box 15'.

In Figures 5 and 7 the arrow at the left indicates the line of travel through which the cylinder is moved. The manifold has its forward end 35 open, which provides an inlet to an air intake chamber 36, while its rear end is open to form an outlet or an exhaust chamber 37. A hood or deflector 38 is interposed between the chambers so as to overhang the combination intake-exhaust port 24' and is open rearwardly to the exhaust chamber.

As shown in Figures 6 and 7, air entering the chamber 35 is deflected by the hood 38 and caused to pass around each side thereof before entering the latter. This air is drawn in to the rear side of the hood and down through the port 24' into the cylinder. The exhaust from the cylinder passes out through the port 24' and is discharged rearwardly from the hood 38 into the chamber 37 from which it escapes.

Various changes in the size and shape of the different parts, as well as modifications and alterations, may be made within the scope of the appended claims.

Having described and illustrated a preferred form of the invention, what I claim, is:

1. A manifold for an oil engine including a sinuous body having an air inlet at one end and an exhaust outlet at the opposite end, said body also having an offset pocket intermediate its ends open at its bottom, with an upright deflector wall separating the air inlet portion from the pocket.

2. A manifold for an oil engine including a pocket intermediate its ends, said pocket having an open bottom for connection with the port of an engine cylinder, said manifold having a longitudinal air passage, the front side of the pocket being closed to said passage and the rear side of said pocket being open to said passage.

3. A manifold having a forwardly flared inlet end and a rearwardly directed exhaust end, a pocket offset at one side of the manifold and having an open bottom, and a deflecting web between the pocket and the flared inlet end, the body of the manifold being curved sinuously from its air inlet to its exhaust outlet and having a continuous passage therethrough contiguous to the pocket.

4. A manifold for an oil engine including a body having an air inlet at its forward end and an exhaust outlet at its ends, and a guard in said body in the path of the inflowing air for deflecting said air and for causing the exhaust gases to flow rearwardly and for preventing said gases from flowing forwardly to the air intake.

5. A manifold for an oil engine having a forward air inlet and a rear exhaust outlet and also a combined air outlet and exhaust inlet intermediate its ends, the exhaust end of the manifold being unrestricted the air inlet of the manifold being laterally offset from the exhaust outlet thereof with respect to the axis of the line of travel, whereby the exhaust gases are induced to flow toward the exhaust outlet.

6. A manifold for an oil engine having a longitudinal passage therethrough and an opening intermediate its ends for connection with an engine cylinder, and means in the passage of the manifold for deflecting the inflowing air and causing it to whirl as it flows through said opening.

7. A manifold for an oil engine having a longitudinal passage therethrough and a pocket in its bottom for connection with the cylinder of an engine, and means within the manifold at the pocket for closing the front side of the pocket to the inflowing air and opening the rear side of the pocket to the rear end of the manifold, whereby the exhaust gases may flow in a direct path to the said exhaust end.

8. A manifold for an oil engine having a longitudinal passage therethrough and a pocket in its bottom, and an upright guard at the pocket within the passage of the manifold for deflecting the exhaust gases to the rear of said passage.

9. A manifold for an oil engine having a longitudinal passage therethrough and a pocket in its bottom offset to one side of the passage, the walls of the manifold adjacent the pocket being arranged to deflect the air currents flowing through said passage and to cause them to whirl upon entering the pocket.

10. A manifold for an internal combustion engine including, a body having a continuous sinuous passage extending therethrough and provided with an air inlet at one end and an exhaust outlet at the opposite end, said body having a laterally offset pocket in said passage open at its bottom and located intermediate the ends of said passage for receiving air currents passing through said passage and whereby said air currents are caused to whirl upon entering said pocket.

In testimony whereof I affix my signature.

FERI A. THAHELD.